March 25, 1947.  J. T. CARLSON  2,417,911

SWITCH FOR AIR CONDITIONING APPARATUS

Filed Dec. 29, 1938   3 Sheets-Sheet 1

INVENTOR
John T. Carlson
BY
ATTORNEYS

March 25, 1947.  J. T. CARLSON  2,417,911
SWITCH FOR AIR CONDITIONING APPARATUS
Filed Dec. 29, 1938  3 Sheets-Sheet 2

Fig. 1ª

INVENTOR
John T. Carlson
BY
ATTORNEYS

March 25, 1947.  J. T. CARLSON  2,417,911
SWITCH FOR AIR CONDITIONING APPARATUS
Filed Dec. 29, 1938  3 Sheets-Sheet 3

INVENTOR
John T. Carlson
BY
ATTORNEYS

Patented Mar. 25, 1947

2,417,911

UNITED STATES PATENT OFFICE 2,417,911

SWITCH FOR AIR-CONDITIONING APPARATUS

John T. Carlson, Dayton, Ohio, assignor to The Master Electric Company, a corporation of Ohio Application December 29, 1938, Serial No. 248,171

40 Claims. (Cl. 200—138)

This invention relates to improvements in switch for air conditioning apparatus and has for an object to provide a device responsive to a condition of the air of a room, such as the temperature thereof, so constructed and arranged as to control the operation of a subsidiary device at one or another of a plurality of pre-selected conditions, such as temperature.

It is a more specific object to provide an improved plural range thermo-responsive device, viz., a thermostat which under certain conditions will effect control of a device controlled thereby at a certain temperature and under other conditions at another temperature.

It is another object to provide such a device which closes a circuit through a switch when a certain temperature is reached and which when said switch is opened closes an equivalent circuit at a different temperature.

Another object is to provide a plural range thermostat actuated by a single thermo-responsive element.

Another object is to provide such a thermostat controlling a low voltage circuit which through a relay will control a line voltage circuit.

It is another object to provide an air conditioning system in which a thermostat in accordance with the invention serves to maintain one or another of a plurality of conditions.

Another object is to provide a snap-action contact device including a magnet, together with means for mounting the magnet adjustably relative to the support and for mounting the contact member adjustably relative to the magnet.

It is another object of the invention to provide such a system in which a two-wire (single circuit) thermostat serves to control a heat source controlling motor of standard construction, such as the usual (two circuit) draft damper regulator.

Further objects and advantages of this invention will be apparent from consideration of the specification as illustrated by the accompanying drawings of possible embodiments of the invention, in which drawings:

Fig. 1 shows in elevation a thermostat illustrating one form which the invention may take, the thermostat being shown connected for controlling a low voltage relay which, in turn, controls a line voltage circuit for controlling a motor such as the driving motor of a stoker, oil burner, or the like;

Figs. 3 and 4 show some further modifications of the invention;

Fig. 6 shows a form of the invention in which two separate thermo-responsive elements are employed.

Figures 1, 3, 4, 6:
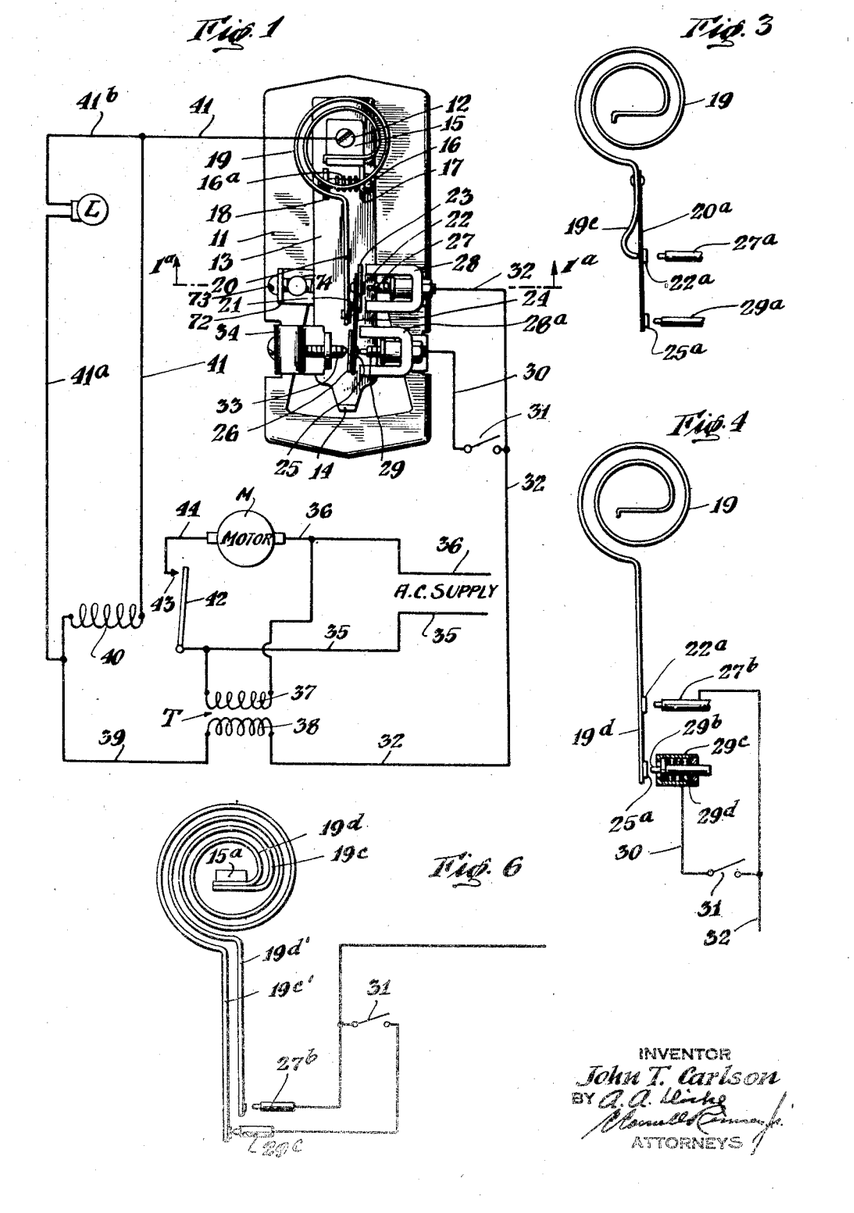

Referring to said drawings, the numeral 11 indicates a base of known or suitable construction, preferably made of insulating material such as Bakelite or other plastic insulating material, upon which is pivoted at the point 12 an arm 13 having pointer 14 which is movable along a scale not shown. Said arm 13 carries a bracket 15 adjustably mounted with respect to arm 13 through the screw 16 passing through extension 17 on bracket 15 and threadably connected with the bracket 18 carried by arm 13. 16a represents a coil spring which serves to hold the parts in position and to exert sufficient friction upon the screw threads to prevent accidental loosening thereof.

The numeral 19 represents a temperature responsive device, such as a coil of thermo metal of usual or suitable construction, which as shown carries a downwardly extending arm 20 to which is attached a bracket 21 of thin spring material. Said bracket 21 serves to support a contact 22 and preferably also a disk or plate 23 of magnetic material and also supports a downwardly extending member 24 of light springy metal which carries a contact 25 and preferably also a disk 26 of magnetic material.

Contact 22 serves to cooperate at certain times with contact 27 which may be an adjustable screw. In order to effect a sudden make or a sudden break of the circuit, a small permanent magnet 28, with which cooperates the magnetic disk 23, is provided. Contact 25 serves to cooperate at certain times with contact 29 which may be an adjustable screw. In order to effect a sudden make or a sudden break of the circuit, a small permanent magnet 28a with which cooperates the magnetic disk 26 is provided.

Figure 1A:
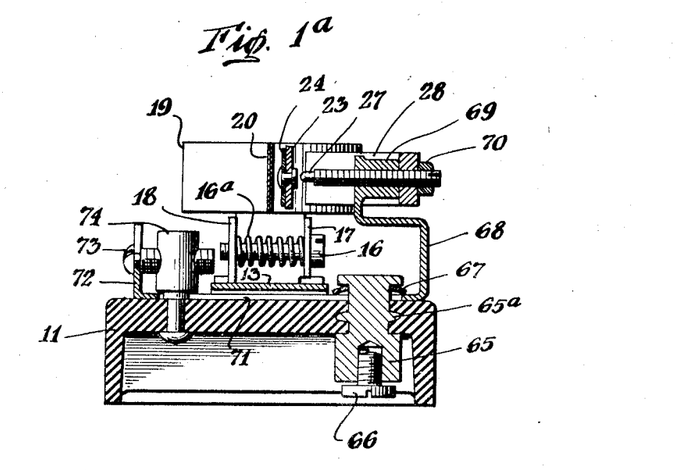
Fig. 1a shows a partial section along the line 1a—1a of Fig. 1.

Fig. 1a shows one form of construction which may be used for mounting the contact 27 and its associated permanent magnet 28. By reference to Fig. 1a it will be noted that 65 represents a metallic stud preferably moulded into the base 11 of the thermostat. As shown, the member 65 has an enlarged portion 65a to assure holding of the stud in the plastic material. One end of stud 65 is shown threaded to receive the screw 66 which serves as a terminal. 67 indicates a spring washer held under a head on the member 65 and bearing upon a member 68 which is slotted as in 71 to accommodate the member 65 and also the member 74 which is carried by the base 11 and has threadably connected thereto a screw 73 having a reduced portion which connects it with the carrier member 72 so that as the screw 73 is turned the member 72—68 will be adjusted transversely. The upper end of member 68 is shown as connected with the hollow threaded stud 69 bearing against the inner side of permanent magnet 28. The threaded contact screw 27 extends through 69 and also through a hole in the magnet 28. The numeral 70 indicates a nut which serves as a lock nut to hold the contact screw 27 in adjusted position and also serves to hold the permanent magnet. It will be seen that by adjusting screw 73 the permanent magnet 28 and the contact screw 27 are together adjusted relative to the base 11 but that by loosening the nut 70 the contact screw 27 can be individually adjusted with respect to magnet 28.

While the means just described for adjustably supporting contact 27 and permanent magnet 28 is shown in connection with the form of thermostat shown in Fig. 1, it is, of course, to be understood that the supporting means as shown and described may be used with any type of thermostat.

It will be noted that with the parts as illustrated, when the arm 20 moves to the right, the contact is first made as between 25 and 29 and that if the arm continues to move further to the right, the contact will be made also as between contacts 22 and 27. Connected to contact 29 is conductor 30 which through switch 31 connects with the conductor 32 which is, however, directly and permanently connected to contact 27. Thus, if switch 31 is closed, an electrical connection will be made as between bracket 15 and conductor 32 as soon as contact 25 touches contact 29. However, if switch 31 is open, no connection will be made until contact 22 touches contact 27 which will, it may be assumed, occur at a lower temperature. In order to increase the sensitivity of control, it is desirable that a stop such as 33 be provided to limit the movement of the contact 25 away from its cooperating contact 29. This stop may be made of either metal or insulating material and is preferably carried by a bracket, such as 34.

Referring to the circuit shown in Fig. 1, conductors 35 and 36 may be permanently connected with any source of alternating current supply at usual line voltage. Winding 37 may be taken as the primary winding of a step-down transformer T which is constantly connected across the A. C. supply, and 38 may represent the secondary of said transformer, one end of which is permanently connected to conductor 32 and the other to conductor 39 which may, through the winding 40 of a relay of standard or suitable construction be connected to conductor 41 which is connected to bracket 15. 42 represents any suitable armature which is attracted by the magnet 40 when energized and serves to engage the contact at 43 which closes a circuit from conductor 35 through conductor 44 to electric motor M, the other side of which is connected to conductor 36, whereby the operation of the electro-motor is controlled by the relay. Said motor may be the driving motor of a stoker or other fuel burner, or in any other suitable manner serve to condition the air in the space within which the thermostat is located.

It will thus be seen that when the switch 31 is closed, the motor M will be started at say a temperature of 70° F., and stopped when a slightly higher temperature is reached. Whereas, when switch 31 is opened, as during the night, the engagement of contact 25 with contact 29 will have no effect upon the relay and electro-motor. However, upon further dropping of the temperature to say 55° F., contact will be made between 22 and 27, thus causing the motor to operate and prevent the temperature dropping to a lower point.

While not essential to the successful use of the invention thus far described, it is highly desirable that some means be provided in connection with the thermostat to indicate whether or not the motor is active. To this end a small lamp L has been provided which is connected in parallel with the winding 40. By means of conductors 41a and 41b, it will be seen that whenever the winding 40 is energized the lamp L will glow and thus serve to indicate that the motor M is operating.

The lamp L is preferably located fairly closely to or at least in heat conductive relation to the thermocoil 19 so that a certain small amount of heat will be conducted to the coil whenever the lamp is active. In this way, the thermocoil is heated a few degrees above the temperature of the ambient air, biasing the thermocoil 19 an amount approximately sufficient to neutralize the pull of the magnet 28a or 28, thus increasing the sensitivity of the thermostat and eliminating overrun.

Figures 2, 5, 7:
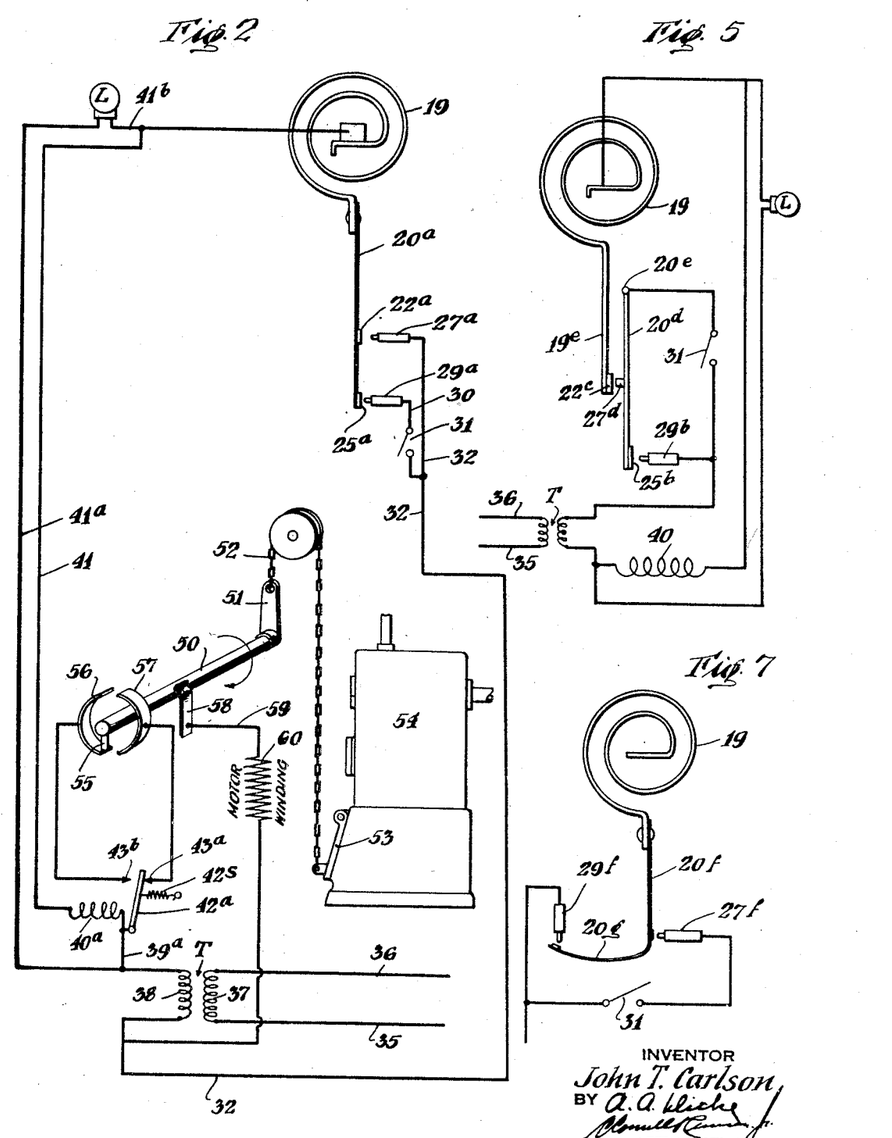
Fig. 2 shows a modified form of plural range thermostat connected for controlling a double throw relay which, in turn, controls the operation of a usual or suitable damper regulator motor.
Fig. 5 shows another modified form connected in a circuit similar to that of Fig. 1.
Fig. 7 shows still another modification.

Fig. 2 shows a modified form of thermostat which serves to control a single pole double throw relay which, in turn, controls a standard damper regulator motor. In said figure, the thermo coil 19 carries a blade 20a of very thin metal which is provided near its end with a contact 25a and between its ends with a contact 22a, which contacts cooperate respectively with stationary preferably adjustable contacts 29a and 27a. The contact 29a is connected by means of conductor 30 and switch 31 to the conductor 32, an extension of which is connected with contact 27a. It will be seen that if switch 31 is closed, the engagement of contacts 25a and 29a will cause an electrical connection to be made between coil 19 and conductor 32 whereas, if switch 31 is opened, no connection is made and upon further dropping of the temperature the blade 20a will be bowed until contact 22a touches contact 27a, which in the form shown occurs at a lower temperature.

Numerals 35 and 36 indicate conductors connected with the supply line which, in the form shown, are connected only to the primary winding 37 of a transformer T having a secondary (preferably lower voltage) winding 38. The transformer secondary is connected through conductor 39a with the winding 40a of a single pole double throw relay having an armature 42a serving to make a contact with contact 43a or 43b, it being normally biased against contact 43a by means of spring 42s. The other end of winding 40a is connected through conductor 41 with the thermo coil 19.

The damper regulator motor, which may be of any desired type, is shown schematically. It may consist of a shaft 50 carrying a crank arm 51 which through chain 52 serves to operate the draft damper 53 of a furnace 54. A suitable electromotor is usually provided which, when energized, serves through reduction gearing to rotate the shaft 50 through 180°. Said shaft is shown as operating a contact arm or brush 55 which engages alternately with segments 56 and 57 connected to contacts 43b and 43a respectively. 58 indicates a brush contacting continuously with shaft 50 for completing a circuit from the brush 55 through conductor 59, through the motor winding 60, and back to that side of the transformer secondary to which the conductor 32 is connected.

It will be seen that when the circuit is closed between 25a and 29a (if switch 31 is closed) or between 22a and 27a (when switch 31 is open), a current will flow from the transformer secondary through winding 40a, conductor 41, thermo coil 19, arm 20a, and conductor 32, and when winding 40a is energized, the connection between 42a and 43a will be broken and a connection established between 42a and 43b so that current will flow from the transformer secondary to the segment 56 through brush 55, shaft 50, brush 58, motor winding 60, and back to the transformer. The motor will thus be caused to operate, rotating shaft 50 and opening the damper 53. This will continue until brush 55 moves off the end of segment 56, whereupon the electric motor will stop operating and the draft damper will remain in open position. Current, however, continues to flow through winding 48 and also through lamp L in parallel therewith, thus serving to indicate that the drafts are open and also serving to supply supplemental heat to thermo coil 19.

When the thermostat circuit is broken due to increased temperature of thermocoil 19, the circuit through winding 40a is interrupted and spring 42s will cause armature 42a to leave contact 43b and engage contact 43a, thus establishing a circuit from the transformer through segment 57, brush 55, shaft 50, brush 58, through the motor winding 60, thus causing the motor to operate until the shaft 50 has rotated 180°, at which time the brush 55 will have ridden off the end of segment 57 and made contact with segment 56. As the motor stops operating, the parts will be left in such a position that draft damper 53 remains closed.

From the above it will be seen that a thermostat of the single circuit type is by means of a double throw relay caused to control a heat regulator motor of the type which is usually controlled by a two circuit thermostat. The construction just described will operate effectively not only with the type of thermostat shown in Fig. 2 but also with that form shown in Figs. 1, 3, 4, 5, and 6, as well as many other thermostats.

Fig. 3 shows a thermostat similar to the one shown in Fig. 2, one difference however being that the thermocoil 19 is formed with an extension 19c which serves to back up the thin spring metal arm 20a so that after the contact 25a has engaged the contact 29a (the switch 31 being open), a smaller movement of thermocoil 19 will suffice to move contact 22a into engagement with contact 27a.

Fig. 4 shows a modified form of thermostat in which the thermocoil 19 is extended downwardly in the form of an arm 19d having contacts 25a and 22a engaging contacts 29b and 27b, respectively. The arm 19d being of fairly stiff metal, the contact 29b is in this case mounted resiliently as by being mounted slidably in sleeve 29c and being biased toward the left by means of spring 29d. In this case, the contact 29b is permitted to move sufficiently to the right (when switch 31 is opened) to permit 22a to engage contact 27b. The operation is the same as in the other figure, the difference being that the arm 19d may in this case be made of relatively stiff material and therefore be integral with the thermocoil 19, the necessary resilience being effected by the mounting of contact 29b.

Fig. 5 shows another modification in which the thermo-responsive element 19 may have a relatively stiff arm 19e having a single contact 22c capable of engaging a contact 27d mounted upon an arm 20d which may be either very thin and flexible and mounted rigidly at the point 20e or may be relatively stiff and pivotally mounted at the point 20e.

The arm 20d is provided with a contact 25b engageable at times with a contact 29b. It will be seen that if switch 31 is closed and the room temperature or other condition changes so that arm 19e moves to the right and contact 22c engages contact 27d, a circuit will be established through the relay coil 40 and a parallel circuit through the lamp L. It will also be seen that if switch 31 is opened no contact will be closed upon the engagement of 22c with 27d but that upon further movement of arm 19e the contact 25b will be caused to engage contact 29b, thus energizing the winding 40.

Fig. 6 shows a modified form of thermostat in which a single support as 15a, which may be adjustably mounted in accordance with Fig. 1, serves to support two independent condition responsive devices such as the bi-metallic thermocoils 19d and 19c which may have extensions 19d' and 19c' and having contacts which are engageable respectively with contacts 27b' and 29c. Said contacts will be so adjusted that they will become active at different temperature intervals.

It will be readily seen that when switch 31 is closed the engagement of contact 19c' with 29c will close the circuit whereas when switch 31 is open nothing will occur until 19d' makes contact with 27b.

Fig. 7 shows a further modification in which the thermo element 19 carries an extension 20f of flexible material provided with a suitable contact engageable with contact 27f. Carried by arm 20f is transverse extension 20g having a contact engageable with a contact 29f. It will be seen that when the switch 31 is closed the engagement of 20f with 27f will close the circuit. However, when switch 31 is open, no contact is made, and upon further movement to the right of its upper end, the arm 20f will be flexed in such a way as to move the outer end of arm 20g upwardly, thus causing it to contact 29f. It will be noted that the arm 20g is so formed that the arm 20f and its extension 20g may be moved to the left (rising temperature) as far as desired without making any connection with contact 29f.

A permanent magnet or other means for causing the contacts to be made and broken suddenly is not shown in any of the figures with the exception of Figs. 1 and 1a. As thermostats of this type are usually employed with relays or the like, it is important that they be provided with some type of snap action contact device and it is to be understood that a permanent magnet or other snap action construction, such as an electromagnet, or some mechanical snap action mechanism, is preferably to be employed in connection with the thermostat shown in Figs. 2, 3, 4, 5, 6, and 7.

It will be noted that the constructions shown and described will serve admirably to accomplish the objects stated above. It is to be understood, however, that the constructions disclosed above are intended merely as illustrative of the invention and not as limiting as various modifications therein may be made without departing from the invention as defined by a proper interpretation of the claims which follow.

I claim:

1. In a thermostat, a thermo responsive device, an arm actuated thereby, a member carrying two contacts swingably attached to said arm and stationary contact points adjacent said contacts, the member being so connected to said arm that one of said contacts will engage its contact point and upon further movement of the arm the other contact will engage its contact point.

2. In a thermostat, a thermo responsive device, an arm actuated thereby, a member carrying two contacts swingably attached to said arm and stationary contact points adjacent said contacts, the member being so connected to said arm that when one of said contacts engages its contact point and the arm is given a further movement the other contact engages its contact point, and a circuit breaker for determining whether the first or the second contact device shall be effective.

3. In a thermostat, a thermo responsive device, an arm actuated thereby, a member carrying two contacts swingably attached to said arm and stationary contact points adjacent said contacts, the member being so connected to said arm that when one of said contacts engages its contact point and the arm is given a further movement the other contact engages its contact point, at least one of said contact pairs being provided with co-acting magnetic means to produce snap action make and break of contacts.

4. In a thermostat, a thermo responsive device, an arm actuated thereby, a member carrying two contacts swingably attached to said arm and stationary contact points adjacent said contacts, the member being so connected to said arm that when one of said contacts engages its contact point and the arm is given a further movement the other contact engages its contact point, at least one of said contact points being provided with a U-shaped magnet having its pole faces arranged with the contact point therebetween, and a paramagnetic element cooperating with said magnet.

5. In an air conditioning device, a member movable as the result of a change of condition of the ambient air, a supporting arm actuated by movement of said member, and a contact carrier swingably connected between its ends to said arm, contacts upon said carrier near the respective ends thereof and relatively stationary contact points mounted on the same side of said carrier in position to be sequentially engaged by the respective contacts on said carrier whereby when one of the contacts on the carrier engages its contact point and the supporting arm is given a further movement the carrier swings relative to the arm and causes its other contact to advance toward its contact point at a higher velocity than the velocity of the supporting arm.

6. In an air conditioning device, a member movable as the result of a change of condition of the ambient air, a supporting arm actuated by movement of said member, and a contact carrier swingably connected between its ends to said arm, contacts upon said carrier near the respective ends thereof and relatively stationary contact points mounted on the same side of said carrier in position to be engaged by the respective contacts on said carrier whereby when one of the contacts on the carrier engages its contact point and the supporting arm is given a further movement the carrier swings relative to the arm and causes its other contact to advance toward its contact point at a higher velocity than the velocity of the supporting arm, at least one of said contact devices being provided with magnetic means to produce snap action.

7. In an air conditioning device, a member movable as the result of a change of condition of the ambient air, a supporting arm actuated by movement of said member, and a contact carrier swingably connected between its ends to said arm, contacts upon said carrier near the respective ends thereof and relatively stationary contact points mounted on the same side of said carrier in position to be engaged by the respective contacts on said carrier whereby when one of the contacts on the carrier engages its contact point and the supporting arm is given a further movement the carrier swings relative to the arm and causes its other contact to advance toward its contact point at a higher velocity than the velocity of the supporting arm, and a common support for said contact points adjustable relative to the carrier.

8. In an air conditioning device, a member movable as the result of a change of condition of the ambient air, a supporting arm actuated by movement of said member, and a contact carrier swingably connected to said arm, contacts upon said carrier near the respective ends thereof and relatively stationary contact points mounted in position to be sequentially engaged by the respective contacts on said carrier whereby when one of the contacts on the carrier engages its contact point and the supporting arm is given a further movement the carrier swings relative to the arm and causes its other contact to advance toward its contact point at a higher velocity than the velocity of the supporting arm.

9. In an air conditioning device, a member movable as the result of a change a condition of the ambient air, a supporting arm actuated by movement of said member, and a contact carrier swingably connected to said arm, contacts upon said carrier near the respective ends thereof and relatively stationary contact points mounted in position to be engaged by the respective contacts on said carrier whereby when one of the contacts on the carrier engages its contact point and the supporting arm is given a further movement the carrier swings relative to the arm and causes its other contact to advance toward its contact point at a higher velocity than the velocity of the supporting arm, at least one of said contact devices being provided with magnetic means to produce snap action.

10. In an air conditioning device, a member movable as the result of a change of condition of the ambient air, a supporting arm actuated by movement of said member, and a contact carrier swingably connected to said arm, contacts upon said carrier near the respective ends thereof and relatively stationary contact points mounted in position to be engaged by the respective contacts on said carrier whereby when one of the contacts on the carrier engages its contact point and the supporting arm is given a further movement the carrier swings relative to the arm and causes its other contact to advance toward its contact point at a higher velocity than the velocity of the supporting arm, at least one of said contact devices being provided with magnetic means to produce snap action, and a common support for said contact points and said magnetic means adjustable relative to said carrier.

11. In a device of the character described, first and second stationary contacts, magnetic means for creating a magnetic force adjacent said contacts, first and second movable contacts cooperable with said first and second stationary contacts to form a pair of switches, magnetic material adjacent each of said movable contacts and cooperable with said magnetic force to render said switches sequentially snap acting, and thermostatic means for moving said movable contacts toward and away from said stationary contacts in response to temperature changes.

12. In a device of the character described, first and second stationary contacts, first and second permanent magnets for creating a magnetic force adjacent said contacts, first and second movable contacts cooperable with said first and second stationary contacts to form a pair of switches, magnetic material adjacent each of said movable contacts and cooperable with said magnetic force to render said switches sequentially snap acting, and bi-metallic thermostatic means for moving said movable contacts toward and away from said stationary contacts in response to temperature changes.

13. In a device of the character described, a thermostat, first and second stationary contacts, first and second movable contacts cooperable therewith to perform a two stage function, said thermostat upon a continued temperature change in one direction first causing said first movable contact to move into engagement with said first stationary contact and then causing said second movable contact to move into engagement with said second stationary contact, said first stationary contact arresting movement of said first movable contact as said second movable contact is moved into engagement with said second stationary contact, and magnetic means for causing said movable contacts to move into and out of engagement with said stationary contacts with a snap action.

14. In a device of the character described, an actuating member, armature means carried thereby and displaceable angularly with respect thereto, magnetic means cooperating with said armature means at a pair of spaced points, and resilient means for moving said actuating member and armature means toward said magnetic means, said magnetic means being so related to said armature means that first one and then the other of said points on said armature means are attracted to said magnetic means.

15. In a device of the character described, a movable member, means exerting a force on said member at a pair of spaced points for biasing said member into a predetermined position, and an actuating member for moving said movable member but permitting a rotative movement of said movable member with respect thereto, the center of rotation of said movable member being closer to one of said points than the other, whereby said one of said points moves first as said movable member is moved out of said predetermined position by said actuating member.

16. In a device of the character described, a pair of stationary contacts, armature means, a pair of movable contacts carried by said armature means for cooperation with said stationary contacts to form a pair of switches, magnetic means attracting said armature means at a pair of spaced points to bias said means for movement into a predetermined position, and an actuating member for moving said armature means out of said predetermined position, said armature means being rotatable with respect to said actuating member about a center which is nearer one of said points than the other whereby one of said switches is always opened before the other and said other switch is always closed before said one switch.

17. In a device of the character described, an actuating member, elongated armature means carried thereby and displaceable angularly with respect thereto, magnetic means cooperating with a pair of spaced points on said armature means, and bimetallic thermostatic means for moving said actuating member and armature means toward said magnetic means, said magnetic means being so related to said armature means that first one and then the other of said points on said armature means are attracted to said magnetic means.

18. In a device of the character described, an armature, mounting means for said armature about which it is adapted to rotate, magnetic means cooperating with said armature at spaced points, said mounting means being nearer one of said points than the other, so that said magnetic means will exert relatively different rotative forces on said armature at said points, and means for moving said mounting means toward and away from said magnetic means.

19. In a device of the character described, an armature, mounting means for said armature about which it is adapted to rotate, magnetic means cooperating with said armature at spaced points, stationary contacts adjacent said points, movable contacts carried by said armature, said mounting means being nearer one of said points than the other, so that said magnetic means will exert relatively different rotative forces on said armature at said points, and means for moving said mounting means toward and away from said magnetic means whereby certain of said contacts will always make before the others, and said others will always be the first to break.

20. In a device of the character described, an armature, a support for said armature about which it is adapted to rotate, magnetic means cooperating with said armature at spaced points, stationary contacts adjacent said points, movable contacts carried by said armature, said support being nearer one of said points than the other, means for moving said support toward and away from said magnetic means whereby certain of said contacts will always make before the others, and said others will always be the first to break, engagement of said contacts limiting the movement of said armature toward said magnetic means, and means for adjusting said stationary contacts for varying the air gap between said armature and said magnetic means when said contacts are made.

21. In a device of the character described, an armature, a support for said armature about which it is adapted to rotate, magnetic means cooperating with said armature at spaced points, stationary contacts adjacent said points, movable contacts carried by said armature, said support being nearer one of said points than the other, means for moving said support toward and away from said magnetic means whereby certain of said contacts will always make before the others, and said others will always be the first to break, and means for limiting the movement of said points away from said magnetic means.

22. In a device of the character described, an armature, a support for said armature about which it is adapted to rotate, magnetic means cooperating with said armature at spaced points, stationary contacts adjacent said points, movable contacts carried by said armature, said support being nearer one of said points than the other, means for moving said support toward and away from said magnetic means whereby certain of said contacts will always make before the others, and said others will always be the first to break, engagement of said contacts limiting the movement of said armature toward said magnetic means, means for adjusting said contacts for varying the air gap between said armature and said magnetic means when said contacts are made, and adjustable means for limiting the movement of said points away from said magnetic means.

23. In a device of the character described, a bimetallic element having a fixed end and a free end, an arm carried by the free end of the element by means of a freely rotatable connection at an intermediate point on said arm, first and second stops limiting the movement of one end of said arm, a third stop limiting the movement of the other end of said arm, and biasing means resisting movement of said one end away from said first stop with a predetermined force and resisting movement of said other end away from said third stop with a predetermined lesser force, whereby said other end always leaves said third stop before said one end leaves said first stop on movement of said bimetallic element in one direction and said one end always engages said first stop before said other end engages said third stop on movement of said bimetallic element in the opposite direction.

24. In a device of the character described a bimetallic element having a fixed end and a free end, an arm carried by the free end of the element by means of a freely rotatable connection at an intermediate point on said arm, first and second movable contacts carried by said arm at opposite sides of said pivotal connection, first and second stationary contacts for engagement by said first and second movable contacts respectively on movement of said arm in one direction, a stop for limiting movement of said arm in the opposite direction, means biasing said first contacts into engagement with a predetermined force and biasing said second contacts into engagement with a predetermined lesser force whereby said first contacts always make first and break last, and means for moving the fixed end of said bimetallic element to vary the temperature at which said contacts are made and broken.

25. In a device of the character described, a bimetallic element having a fixed end and a free end, an armature carried by the free end of the element by means of a rotatable connection intermediate the ends of said armature, magnetic means attracting said armature at first and second points on opposite sides of said rotatable connection, one of said points being nearer said connection than the other, and means for limiting the movement of said armature in each direction.

26. In a device of the character described, a bimetallic element having a fixed end and a free end, an armature carried by the free end of the element by means of a rotatable connection intermediate the ends of said armature, a pair of movable contacts carried by said armature at opposite sides of said rotatable connection, stationary contacts cooperating therewith, magnetic means tending to hold one pair of contacts in engagement with a greater force than the other pair, and means for limiting the movement of said armature away from said stationary contacts.

27. In a device of the character described, a bimetallic element having a fixed end and a free end, an armature carried by the free end of the element by means of a rotatable connection intermediate the ends of said armature, magnetic means attracting said armature at a point on one side of said rotatable connection and at a point on the other side of said rotatable connection, one of said points being nearer the rotatable connections than the other, and means limiting the movement of said armature away from said magnet.

28. A switching mechanism for the control of plural independent electrical circuits, including spaced stationary contacts, one for each circuit, spaced movable contacts, one for each of the stationary contacts, oscillatory mounting means for the movable contacts, and a movable support therefor upon which the mounting means is supported in unbalanced relation about its center of oscillation, the construction and arrangement being such that upon progressive movement of the support toward the stationary contacts, the movable contacts will be sequentially engaged therewith to close the independent electrical circuits in sequence.

29. A switching mechanism for the control of plural independent electrical circuits, including relatively spaced movable contacts, one for each circuit, stationary contacts with which the movable contacts cooperate to close the respective circuits, a swinging carrier common to the movable contacts, a movable support for said carrier upon which the carrier is supported for tilting movement, magnetic means adjacent the stationary contacts cooperating with the swinging carrier to produce a snap action switch for each of said circuits, said magnetic means being in differently spaced relation relative to the point of suspension of the carrier upon its support, the construction and arrangement being such that upon movement of the support toward the magnetic means, the movable contacts are brought into engagement with their cooperating stationary contacts to close the independent electrical circuits in predetermined sequence, in accordance with the different spacing of the magnetic means relative to the suspension point of the carrier upon the support.

30. A switching mechanism for the control of plural independent electrical circuits, including spaced movable contacts, one for each circuit, a swinging carrier common to the movable contacts, a movable support upon which the carrier is supported for tilting movement, spaced stationary contacts with which the movable contacts cooperate to close the respective electrical circuits, and means causing the sequential engagement of the spaced movable contacts with their cooperating stationary contacts to close the respective electrical circuits in predetermined sequence.

31. A switching mechanism for the control of plural independent electrical circuits, including spaced movable contacts, one for each circuit, a carrier member common to the movable contacts, a movable support for said carrier relative to which the carrier is capable of independent movement, spaced stationary contacts cooperating with the movable contacts to close the respective electrical circuits upon engagement of the respective pairs of movable and stationary contacts, and means for closing the respective electrical circuits in sequence at spaced intervals upon movement of the support toward the stationary contacts.

32. A switching mechanism for the control of independent electrical circuits, including spaced movable contacts, one for each circuit, a carrier member common to the movable contacts, a movable support for the carrier relative to which the carrier is capable of independent movement, spaced stationary contacts cooperating with the movable contacts to close the respective electrical circuits upon engagement of the respective pairs of movable and stationary contacts, means for opening the respective electrical circuits in sequence at spaced intervals upon movement of the support away from the stationary contacts, and means for limiting movement of the support and carrier member away from the stationary contacts.

33. A switching mechanism for the control of independent electrical circuits, including spaced movable contacts, one for each circuit, a carrier member common to the movable contacts, a movable support for the carrier relative to which the carrier is capable of independent movement, spaced stationary contacts cooperating with the movable contacts to open and close the respective electrical circuits upon movement of the movable contacts into and out of engagement therewith, means for causing independent movement of the carrier relative to the support upon movement of the support toward and away from the stationary contacts, the construction and arrangement being such that the respective electrical circuits are closed and opened in sequence upon movement of the support in alternate directions, and means for limiting movement of the support and carrier member away from the stationary contacts.

34. In a device of the character described, an actuating member, an armature means carried thereby and displaceable angularly with respect thereto, magnetic means cooperating with said armature means at a pair of spaced points, and resilient means for moving said actuating member and armature means toward said magnetic means, the axis about which said armature means rotates with respect to said actuating member being closer to one of said points than to the other, whereby said other point is first attracted to said magnetic means as said actuating member moves the armature means toward said magnetic means.

35. In a device of the character described, a movable member, a first switch associated with one end of said member, a second switch associated with the other end of said member, means exerting a force on said member at a pair of spaced points for biasing said member into a predetermined position, and an actuating member for moving said movable member out of and into said predetermined position, said movable member being rotatable with respect to said actuating member and the center of rotation being nearer one of said spaced points than the other whereby one of said switches is actuated first as said movable member is moved out of said predetermined position and the other of said switches is actuated first as said movable member is moved into said predetermined position.

36. In a device of the character described, a pair of stationary contacts, armature means, a pair of movable contacts carried by said armature means for cooperation with said stationary contacts to form a pair of switches, magnetic means attracting said armature means at a pair of spaced points to bias said means for movement into a position where both of said switches are closed, means for adjusting said stationary contacts whereby the minimum gap between said armature means and said magnetic means may be predetermined at each of said points, and thermostatic means for moving said armature means, said armature means being rotatable with respect to said thermostatic means about a center which is closer to one of said points than the other whereby said one switch is always opened first and said other switch is always closed first.

37. In a device of the character described, armature means, a pair of movable contacts carried by said armature means, one contact located at one end of the armature means and the other contact at the other end of the armature means, a pair of stationary contacts mounted for cooperating with said movable contacts, magnetic means attracting the ends of the armature means in a direction to close the switches, a thermostat, said armature means being carried by and rotatable with respect to said thermostat, the center of rotation being nearer one end of the armature than the other.

38. In a device of the character described, armature means, a first permanent magnet acting on one end of the armature means, a second permanent magnet acting on the other end of the armature means, a first stationary contact adjacent said first magnet, a second stationary contact adjacent said second magnet, a pair of movable contacts carried by said armature means cooperating with said first and second contacts to form first and second switches, and a resilient actuating member, said armature being carried thereby and rotatable with respect thereto, the center of rotation being nearer the first magnet than the other whereby said switches are actuated in sequence as said armature means is moved by said actuating member, said first switch always opening first and said second switch always closing first.

39. In a device of the character described, a thermostat, armature means, a flexible connection between said thermostat and armature means by means of which the latter is carried by and rotatable with respect to the former, a pair of stationary contacts, a pair of movable contacts carried by said armature means, one of said contacts being located at one end and the other at the other end of said armature means, and magnetic means attracting the ends of the armature means, the center of rotation of said armature means being nearer one end than the other whereby said one end always moves away from said magnetic means first and said other end always moves toward said magnetic means first.

40. In a device of the character described, a bimetallic thermostat, a resilient blade carried by said thermostat, armature means carried by said blade, said blade having reverse bends so that said armature may be rotated with respect to said bimetallic thermostat, the center of rotation being nearer one end of said armature means than the other, a pair of movable contacts located at opposite ends of said armature means and carried thereby, stationary contacts cooperating with said movable contacts, and a permanent magnet located adjacent each of said stationary contacts and urging said armature means into contact closed position.

JOHN T. CARLSON.

REFERENCES CITED

The following references are of record in the file of this patent:

UNITED STATES PATENTS

| Number | Name | Date |
|---|---|---|
| 1,914,105 | Bletz | June 13, 1933 |
| 1,969,974 | Erickson | Aug. 14, 1934 |
| 2,096,502 | Wetzel | Oct. 19, 1937 |
| 1,678,856 | Forshee | July 31, 1928 |
| 2,151,782 | Lockwood | Mar. 28, 1939 |
| 1,876,636 | Dicke | Sept. 13, 1932 |
| 1,885,053 | Slough | Oct. 25, 1932 |
| 1,981,707 | Newell | Nov. 20, 1934 |
| 1,757,951 | Breese, Jr. | May 13, 1930 |
| 1,883,251 | Spencer et al. | Oct. 18, 1932 |
| 2,030,933 | Persons | Feb. 18, 1936 |
| 1,899,671 | Clark | Feb. 28, 1933 |
| 2,021,440 | Wheeler et al. | Nov. 19, 1935 |
| 1,976,954 | Mantz | Oct. 16, 1934 |
| 2,171,272 | Kransmiller et al. | Aug. 29, 1939 |
| 2,189,653 | Luthe | Feb. 6, 1940 |